(12) United States Patent
Lichtenberg et al.

(10) Patent No.: US 6,459,983 B1
(45) Date of Patent: Oct. 1, 2002

(54) METHOD AND APPARATUS FOR CONTROLLING THE SPEED AND SPACING OF A MOTOR VEHICLE

(75) Inventors: Bernd Lichtenberg, Vaihingen/enz.; Werner Uhler, Bruchsal, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/468,671

(22) Filed: Dec. 21, 1999

(30) Foreign Application Priority Data

Dec. 22, 1998 (DE) .......................................... 198 59 284

(51) Int. Cl.⁷ .............................. G06F 7/00; G06F 17/00
(52) U.S. Cl. ........................ 701/96; 701/301; 340/903; 342/69; 342/70; 180/169; 180/170; 180/178; 250/208
(58) Field of Search ..................... 701/96, 93; 180/169, 180/175, 168, 170, 178; 340/904, 903, 901, 902; 342/71; 367/99

(56) References Cited

U.S. PATENT DOCUMENTS

| | | | |
|---|---|---|---|
| 5,165,497 A | * 11/1992 | Chi ............................. | 180/169 |
| 5,230,400 A | * 7/1993 | Kakinami et al. .......... | 180/169 |
| 5,400,864 A | * 3/1995 | Winner et al. .............. | 180/169 |
| 5,629,851 A | * 5/1997 | Williams et al. ............ | 701/96 |
| 5,839,534 A | * 11/1998 | Chakraborty et al. ....... | 180/169 |
| 6,116,369 A | * 9/2000 | King et al. .................. | 180/169 |
| 6,134,497 A | * 10/2000 | Hayashi et al. ............. | 701/70 |
| 6,185,499 B1 | * 2/2001 | Kinoshita et al. ........... | 701/96 |
| 6,192,309 B1 | * 2/2001 | Brestl et al. ................. | 701/93 |
| 6,246,949 B1 | * 6/2001 | Shirai et al. ................. | 701/96 |

FOREIGN PATENT DOCUMENTS

| | | |
|---|---|---|
| DE | 42 00 694 | 7/1993 |
| DE | 44 37 678 | 5/1996 |
| DE | 195 14 023 | 10/1996 |

* cited by examiner

*Primary Examiner*—William A. Cuchlinski, Jr.
*Assistant Examiner*—Tuan L To
(74) *Attorney, Agent, or Firm*—Kenyon & Kenyon

(57) ABSTRACT

A method for controlling the speed and spacing of a motor vehicle taking into account the spacing from any preceding vehicles, such that in the event that a relevant preceding vehicle is detected, a spacing control system is superimposed onto the speed control system, and such that the spacing control system automatically decelerates the controlled vehicle if the spacing from a preceding vehicle falls below a set reference spacing, such that the fact that the decrease in spacing below the reference spacing was brought about by the driver of the controlled vehicle is recognized on the basis of at least one further indicator; and/or such that the fact that the motor vehicle is traveling in the outermost left lane of the lanes provided for one direction of travel is recognized on the basis of at least one further indicator; and that in this case, automatic deceleration is attenuated or omitted.

23 Claims, 1 Drawing Sheet

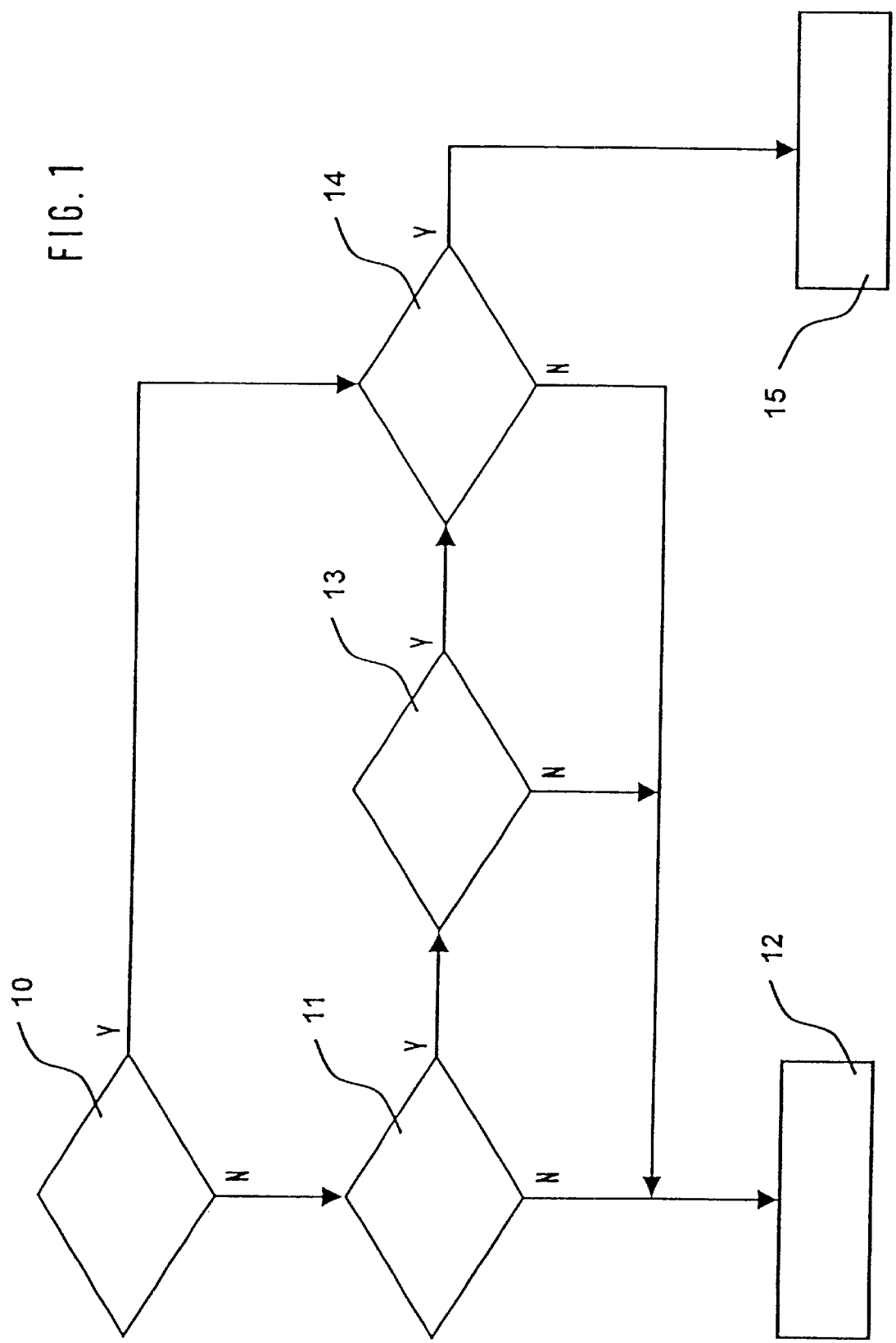

METHOD AND APPARATUS FOR CONTROLLING THE SPEED AND SPACING OF A MOTOR VEHICLE

FIELD OF THE INVENTION

The present invention relates to a method and an apparatus for controlling the speed and spacing of a motor vehicle. A system for controlling the speed and spacing of a motor vehicle can, without intervention by the driver, control a previously set speed and/or a previously set spacing from a preceding vehicle or from objects located in the direction of travel. This is done with appropriate consideration of the surroundings of the motor vehicle and optionally of further parameters, for example weather conditions and visibility. A system of this kind is also referred to as an adaptive cruise control (ACC) system. The ACC system must be flexible enough, especially in view of today's increasing traffic density, to react suitably to all driving situations.

BACKGROUND INFORMATION

German Patent No. 44 37 678 describes a method for controlling the spacing of motor vehicles based on the goal of making possible a flexible and variable definition of the reference spacing in the spacing control system. The method takes into account a desired spacing, predefined by the driver of the motor vehicle, from the preceding vehicle. The spacing control system can be activated when the desired spacing lies within a specific spacing range between a minimum and a maximum value. At the moment the spacing control system is activated, the desired spacing is set to the current spacing from the preceding vehicle. When the spacing control system is activated, the driver of the motor vehicle can increase or decrease the desired spacing by gently braking or accelerating. Preset maximum acceleration and deceleration values must not be exceeded in this context, since otherwise deactivation of the system would occur. Defined minimum and maximum threshold values cannot be exceeded in the course of changes in the desired spacing by the driver of the motor vehicle.

German Patent Application No. 195 14 023 describes a method and an apparatus for controlling the speed and spacing for a motor vehicle in which the speed is controlled as long as there is no preceding vehicle located within a predefined detection region in front of the vehicle. If a preceding vehicle is located inside the predefined detection region in front of the vehicle, the spacing from the preceding vehicle is controlled. This spacing control system establishes a reference spacing from the preceding vehicle that is speed-dependent, possesses a fixed component, and moreover can be adaptively adjusted to weather conditions, the time interval with respect to the preceding vehicle, and driver behavior. The Application is based on the goal of developing a control method for lane changes. In achieving this goal, a distinction is made as to whether a lane change is being made to the right or to the left.

In the case of a lane change to the left, which is detected by fact that the directional indicator (blinker) is set to the left, either the reference spacing from the preceding vehicle is reduced, or spacing control is terminated at the time the blinker is set. In the former case of a reduced reference spacing, the vehicle is accelerated in order to achieve the now-smaller reference spacing. Acceleration takes place to no more than the speed that was set by the driver in the spacing control Tempomat (cruise control). As soon as the directional indicator is moved back out of the "left" position into the "neutral" or "right" position, the reference spacing is once again set back to the normal value. In the second case, the spacing control system is shut off and an acceleration control system is activated. In this, a minimum spacing from the preceding vehicle is defined for the system; when this is reached, the acceleration control system is shut off, and a transition is made back to spacing control.

In the case of a lane change to the right, which is detected by the fact that the directional indicator (blinker) is set to the right, if the result is that a preceding vehicle leaves the detection region, then acceleration is set to a maximum value. This maximum value is equal to the greater of the two values zero or the actual acceleration value at the time the preceding vehicle left the detection region. In graphic terms, this prevents a preceding vehicle from being overtaken on the right when a change is made to a right-hand lane. Once again, in the case of a lane change to the right, acceleration occurs to no more than the speed that was set by the driver in the spacing control Tempomat.

German Patent No. 42 00 694 describes a method for controlling the speed and spacing of a vehicle. With this method, the vehicle control system is interrupted for a predefined period of time, and the control system is then reactivated. The interruption can be accomplished by actuating the blinker (directional indicator). If the left blinker is set above a specific speed, the system then concludes that a passing maneuver is imminent. In this case the spacing control system is interrupted for a predetermined period of time so that the vehicle can be accelerated up to the maximum speed predefined by the driver. The spacing control system then re-engages. In other words, the spacing from the preceding vehicle is measured and the instantaneous speed of the vehicle is reduced, when a safety spacing is reached, until the vehicle is trailing the preceding vehicle at its speed. Re-engagement of the spacing control system is accomplished after the expiration of timing elements that can also be speed-dependent, in such a way that the so-called "driver dominance" decreases from a value of 1 (100% driver dominance) to a value of 0 (100% controller dominance). If the right blinker is set or the left blinker is actuated below a minimum speed, it is assumed that merely a lane change, rather than a passing maneuver, is taking place. In this case an interruption of the spacing control system does take place for a specific time period, but the control system does not perform any acceleration. If no object is located within the measurement region, the driver dominance rises as a function of time, for example in linear fashion within two seconds, to a value of 1.

The references known from the existing art concern themselves with an imminent passing maneuver that is detected by the fact that a blinker is set. There is no information in the existing art regarding the situation in which a driver of a vehicle is already traveling in the outermost left lane of a road and would like to make the preceding vehicle aware of his or her own desire to pass.

SUMMARY OF THE INVENTION

An object of the present invention is to provide a method and an apparatus that reliably and conveniently control the ACC system in those situations in which the driver of a motor vehicle wishes to make the driver of a preceding vehicle aware of his or her own desire to pass.

BRIEF DESCRIPTION OF THE DRAWING

FIG. 1 shows an exemplary embodiment of the method according to the present invention.

DETAILED DESCRIPTION

FIG. 1 shows a flow chart of the method according to the present invention. This method can, for example, be integrated into the control device of an ACC system. An ACC system controls the speed and spacing of a motor vehicle, taking into account the spacing with respect to any preceding vehicles. It is generally possible for the driver of a vehicle equipped with an ACC system to set a reference speed and a reference spacing. The reference speed constitutes the speed of the driver's own vehicle for the case in which no preceding vehicles or any other obstacles are present. For the case in which relevant preceding vehicles are detected, a spacing control function is superimposed on the speed control system. In this, the preset reference spacing from the preceding vehicle is established by the ACC system. The reference spacing from the preceding vehicle is the spacing that is established as standard by the ACC system if no situations are present that require particular control. Both the reference speed and the reference spacing can be predefined by the driver. The reference spacing can be defined, for example, as a time input; a reference spacing of approximately 1 to 2 seconds has proven advantageous. If the spacing from the preceding vehicle falls below the reference spacing, the controlled vehicle is automatically decelerated by the spacing control system. In the converse case, when the reference spacing is exceeded, the controlled vehicle is automatically accelerated by the spacing control system.

Means are generally provided within the ACC system that monitor the motor vehicle's surroundings for particular situations. One particular situation, for example, occurs if the motor vehicle is traveling in the outermost left lane of the lanes provided for one direction of travel, and the driver of the motor vehicle wishes to make the driver of a preceding vehicle aware of his or her own desire to pass. It is conceivable, for example, in order to attract the attention of the driver of the preceding vehicle, to actuate the horn, flash the headlights, set the left blinker, or accelerate in order to come slightly closer to the car ahead. Especially when the spacing from the preceding vehicle falls below the reference spacing as a result of acceleration, it is necessary to perform a particular control action within the ACC system. If this situation were controlled with the standard control algorithm, it would result in an immediate deceleration of the vehicle, since the ACC system would immediately begin to establish the preset reference spacing. This can, however, result in a critical situation for following traffic, since from the viewpoint of the following traffic, the controlled vehicle is decelerating in a surprising fashion. Utilization of a particular control algorithm in these situations requires the method according to the present invention as shown in FIG. 1 in order to detect such a situation.

Step 10 of the flow chart first tests whether the vehicle's accelerator pedal is being depressed. If not, then step 11 additionally tests whether the left blinker is set. If this is also not the case, it is concluded that an ordinary driving situation is present, and standard controller 12 is activated. If it is ascertained in step 11 that the left blinker is set, then step 13 additionally tests whether the controlled vehicle is located in the outermost left lane. If not, it is concluded, for example, that a passing maneuver is imminent, and standard controller 12 is activated. If it was ascertained in step 13 of the flow chart that the controlled vehicle is in the outermost left lane, then execution proceeds with step 14. Execution also proceeds with step 14 if it was found in step 10 that the accelerator pedal of the controlled vehicle is being actuated or depressed. Step 14 then tests, as the last criterion of this exemplary embodiment, whether the spacing has fallen greatly below the reference spacing ($d_{soll}$) from the preceding vehicle. If not, standard controller 12 is once again activated. If the spacing has fallen greatly below the reference spacing ($d_{soll}$), special controller 15 is activated. The purpose of special controller 15 is to prevent the aforementioned critical situations for following traffic. The query performed in step 14—whether the spacing has fallen greatly below the reference spacing ($d_{soll}$)—should be understood in terms of the fact that a temporarily less severe decrease below the reference spacing ($d_{soll}$) still lies within the context of what can be controlled out with standard controller 12 in a sufficiently comfortable and reliable manner. In the case of the test performed in step 11 as to whether the left blinker is set, it would also be possible, instead of or in addition thereto, to query the headlight flasher and/or the horn. The method according to the present invention depicted in FIG. 1 executes recursively within the ACC system. This means that the flow chart depicted is executed again at every point in time during operation.

Among the purposes of special controller 15 is to monitor the spacing from the preceding vehicle. Particular attention is paid, in this context, to ensuring that the automatic deceleration is attenuated only to such an extent, or discontinued only for such a time, that the spacing from the preceding vehicle does not fall below a predefined minimum. The spacing monitoring function thus continues to operate even while the controlled vehicle is "tailgating." When the indicators represented by steps 11, 13, and 14 are no longer present, the selected reference spacing is established using standard controller 12. This establishment of the reference spacing can be accomplished, for example, by way of a deceleration that rises over time, satisfying a temporally linear ramp function. It is also conceivable for the reference speed to be established using a constant reversion speed, for the reference speed to be established within a predefined time, or for the reference spacing to be established with a reversion speed that is a function of the current vehicle speed. In any case, standard controller 12 controls the deceleration in such a way that as the reference spacing from the preceding vehicle is approached, the relative speed between the controlled vehicle and preceding vehicle transitions asymptotically to zero.

A particular advantage of the method according to the present invention is that in specific traffic situations, the ACC system exhibits less critical behavior for following traffic. In particular, drivers of a motor vehicle who are not yet especially familiar with the ACC system can maintain their accustomed behavior, such as following more closely or setting the blinker in order to transmit a desire to pass.

It is also within the context of the method according to the present invention that a situational interpretation that goes beyond recognition of the left lane is performed by the ACC system. This can be, for example, observation of objects surrounding the controlled vehicle, for example vehicles in adjacent lanes. Data of the controlled vehicle, for example lane position, can also be incorporated into the situational interpretation.

What is claimed is:

1. A method for controlling a speed and a spacing of a motor vehicle, comprising the steps of:

if a relevant preceding vehicle is detected, superimposing a spacing control system onto a speed control system;

using the spacing control system, automatically decelerating the motor vehicle if a spacing between the motor vehicle and the preceding vehicle falls below a predefined reference spacing;

recognizing, as a function of at least one indicator: (a) a traveling of the motor vehicle in an outermost left lane of lanes provided for one direction of travel; and if (a) is recognized, reducing the automatic deceleration of the motor vehicle.

2. The method according to claim 1, further comprising the step of controlling the spacing between the motor vehicle and the preceding vehicle to the predefined reference spacing when the at least one indicator is no longer present, the controlling of the spacing between the motor vehicle and the preceding vehicle being performed by the spacing control system.

3. The method according to claim 2, wherein the predefined reference spacing is established by way of a temporally increasing deceleration.

4. The method according to claim 3, wherein the temporally increasing deceleration is a temporally linear ramp function.

5. The method according to claim 2, wherein the predefined reference spacing is established with a constant reversion speed.

6. The method according to claim 2, wherein the predefined reference spacing is established within a predefined time.

7. The method according to claim 2, wherein the predefined reference spacing is established with a reversion speed that is a function of a current speed of the motor vehicle.

8. The method according to claim 2, further comprising the step of transitioning asymptotically to zero a relative speed between the motor vehicle and the preceding vehicle as the predefined reference spacing from the preceding vehicle is approached.

9. The method according to claim 1, further comprising the step of recognizing, as a function of the at least one indicator: (b) a decrease in spacing below the reference spacing that was brought about by a driver of the motor vehicle; and if at least one of (a) and (b) is recognized, reducing the automatic deceleration of the motor vehicle.

10. The method according to claim 9, wherein, if at least one of (a) and (b) is recognized, the automatic deceleration of the motor vehicle is eliminated.

11. The method according to claim 9, wherein the at least one indicator for recognizing (b) indicates an actuation of an accelerator pedal of the motor vehicle.

12. The method according to claim 1 or 9, wherein the at least one indicator includes at least one of a horn, a headlight flasher and a blinker of the motor vehicle.

13. The method according to claim 1 or 9, wherein the automatic deceleration is reduced only when the spacing does not fall below a predefined minimum spacing.

14. The method according to claim 9, further comprising the step of controlling the spacing between the motor vehicle and the preceding vehicle to the predefined reference spacing when the at least one indicator is no longer present, the controlling of the spacing between the motor vehicle and the preceding vehicle being performed by the spacing control system.

15. The method according to claim 14, wherein the predefined reference spacing is established with a constant reversion speed.

16. The method according to claim 14, wherein the predefined reference spacing is established within a predefined time.

17. The method according to claim 14, wherein the predefined reference spacing is established with a reversion speed that is a function of a current speed of the motor vehicle.

18. The method according to claim 14, further comprising the step of transitioning asymptotically to zero a relative speed between the motor vehicle and the preceding vehicle as the predefined reference spacing from the preceding vehicle is approached.

19. The method according to claim 14, wherein the predefined reference spacing is established by way of a temporally increasing deceleration.

20. The method according to claim 19, wherein the temporally increasing deceleration is a temporally linear ramp function.

21. An apparatus for controlling a speed and a spacing of a motor vehicle, comprising:

means for superimposing a spacing control system onto a speed control system if a relevant preceding vehicle is detected;

means for automatically decelerating the motor vehicle, using the spacing control system, if a spacing between the motor vehicle and preceding vehicle falls below a predefined reference spacing;

means for recognizing, as a function of at least one indicator: (a) a traveling of the motor vehicle in an outermost left lane of lanes provided for one direction of travel; and means for reducing the automatic deceleration of the motor vehicle if (a) is recognized.

22. The Apparatus according to claim 21, wherein the means for recognizing is adapted to further recognize, as a function of the at least one indicator: (b) a decrease in spacing below the reference spacing that was brought about by a driver of the motor vehicle; and wherein the means for reducing the automatic deceleration of the motor vehicle is adapted to reduce the automatic deceleration of the motor vehicle if at least one of (a) and (b) is recognized.

23. The apparatus according to claim 22, wherein, if at least one of (a) and (b) is recognized, the automatic deceleration of the motor vehicle is eliminated.

* * * * *